Figure 1:
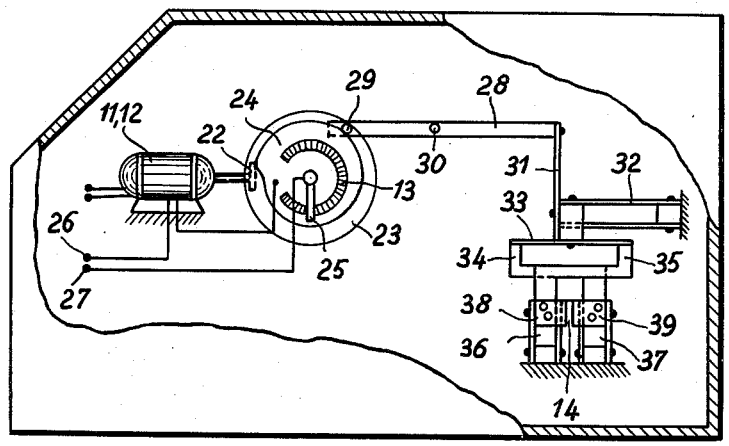

Dec. 26, 1961  H. PLESSE ETAL  3,014,401
SPECTROPHOTOMETER

Filed April 17, 1959  2 Sheets-Sheet 1

3,014,401
SPECTROPHOTOMETER

Hans Plesse, Heidenheim an der Brenz, Wurttemberg, and Erwin Wiedmann, Essingen, Kreis Aalen, Wurttemberg, Germany, assignors to Carl Zeiss, Heidenheim an der Brenz, Wurttemberg, Germany
Filed Apr. 17, 1959, Ser. No. 807,256
Claims priority, application Germany May 30, 1958
1 Claim. (Cl. 88—14)

The present invention relates to a spectrophotometer which indicates the measuring value electrically. Such spectrophotometers are e.g. used for measuring the spectral extinction of light-transmitting substances or for measuring the factor of spectral reflection or remission at the surface of diffusely dispersing bodies.

In executing measurements with the help of spectrophotometers of prior art it is necessary to perform the following steps. First a standard substance is placed in the path of the light emanating from the monochromator. Thereupon the exit slit of said monochromator is opened until the pointer deflection on the indicating instrument reaches approximately the desired value of deflection. The accurate adjustment of the desired value of deflection is performed by means of an adjustment of the series amplifier, whereby the deflection is adjusted until it amounts to 100 scale divisions. Then the standard substance is removed and replaced by the substance to be measured. The pointer deflection of the indicating instrument corresponds now e.g. to the transmission of the substance to be measured whereby one can read directly the percentage of the transmission compared with the transmission of said standard substance which is assumed to be 100 percent.

The adjustment of the spectrophotometer to the deflection 100 of the indicating instrument must be performed before every measurement. This adjustment is cumbersome owing to the necessity for regulating the slit width of the exit slit of the monochromator and the amplification factor of the series amplifier. By comparison with the other steps in the measuring procedure it is too time-consuming.

The object of the present invention is a spectrophotometer which performs said adjustment automatically as soon as the standard substance is moved in the path of the light emanating from the monochromator. This is attained in that a follower control is coupled to the exit slit of the monochromator which automatically adjusts the slit width of the exit slit of the monochromator until the pointer deflection on the indicating instrument reaches the desired value, e.g. the value 100.

The follower control comprises a servo-motor effecting the adjustment of the width of said slit, circuit means for producing a stabilized voltage causing the desired pointer deflection on the indicating instrument, and circuit means for comparing said stabilized voltage with the voltage applied to the measuring instrument when the measurement is carried out. Coupled to the said circuit means for comparing said voltages is an amplifier which in turn is electrically connected to said servo-motor.

In order to enable the pointer deflection on the indicating instrument to be adjusted to the desired value with maximum accuracy it is necessary to adjust the width of the exit slit of the monochromator with at least twice the relative accuracy. It is, therefore, a further object of the invention to provide an exit slit of the monochromator which can be adjusted with the necessary accuracy.

Figure 2:
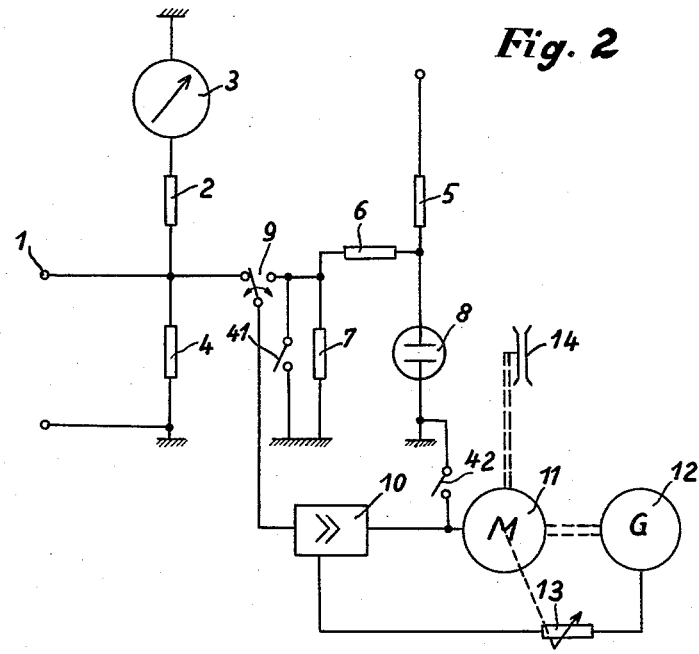
Figure 3:
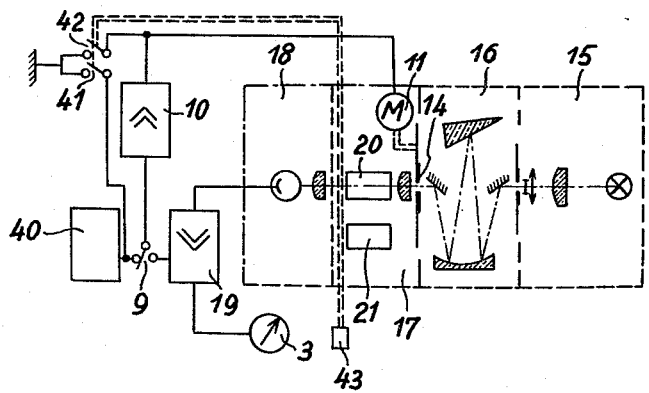

In the accompanying drawings FIGURES 1 to 3 show an embodiment of the spectrophotometer of the invention.

FIG. 1 shows the exit slit of the monochromator and the elements effecting its adjustment, FIG. 2 shows the schematic construction of a spectrophotometer according to the invention, and FIG. 3 shows a basic schematic circuit of the follower control.

FIGURE 1 shows the housing of the monochromator of the spectrophotometer with its anterior wall partly broken open and revealing the exit slit 14 of the monochromator. This slit 14 consists of two movable slit jaws 38 and 39 which are each connected with a pair of leaf springs 36 and 37 forming a parallelogram linkage. On the slit jaws are fastened crossing arms 34 and 35 which are bridged by the adjustment leaf spring 33. At the middle of the leaf spring 33 is, attached to one end of a lever 28 a pin 31. This pin 31 is rigidly coupled with a further pair of leaf springs 32. The lever 28 is pivoted at 30 and has at its other end a pin 29 which slides on the disc cam 24. A servo-motor 11 is coupled to said disc cam 24 via gears 22. Attached to the disc cam 24 there is a resistance 13 on which a fixed tap 25 slides.

When the servo-motor 11 starts the disc cam 24 may for instance be rotated clockwise. Thereby the lever 28 is also swivelled clockwise so that the leaf spring 33 is loaded. The vertical limbs of the arms 34 and 35 are thereby made to approach one another and the slit jaws 38 and 39 separate from each other. In this way the exit slit 14 is opened.

FIGURE 2 serves to explain the mode of operation of the follower control. The measuring voltage delivered from the photo-electric cell of the spectrophotometer is supplied via a terminal 1. It is fed on the one hand via a resistance 2 to the indicating instrument 3 and on the other hand to a resistance 4. The voltage drop in this resistance corresponds to the voltage applied to the indicating instrument 3. The voltage divider 5, 6, 7 is so adjusted that the voltage drop in the resistance 7 causes exactly the desired pointer deflection in the indicating instrument 3. The voltage of the resistance 7 is stabilized by means of a glow stabilizer 8.

If the measuring voltage differs from the fixed reference voltage dropping across the resistance 7 a voltage difference occurs which is transformed into an alternating current in the vibrator relay 9 and then fed into an alternating current amplifier 10. From the said amplifier the voltage goes to the servo-motor 11 which serves to adjust the exit slit 14 of the monochromator 16 as shown in FIG. 1. Connected to the servomotor 11 is a generator 12 which in turn is electrically connected to the amplifier 10 via a variable resistance 13. The said resistance is altered upon adjustment of the slit width by means of the servo-motor 11 so that in consequence the negative feedback voltage applied by the generator 12 to the amplifier depends on the slit width. This voltage serves to keep the regulation stable while having the maximum speed of regulation i.e. to suppress oscillations.

Connected to the resistance 7 is a switch 41 by means of which the comparison voltage can be short-circuited. A further switch 42 serves to short-circuit the output of the amplifier 10. Both switches are coupled to each other. They are automatically actuated after the comparison measurement has been performed in order to avoid disturbing side-effects.

With the help of the FIGURE 3 the mode of operation of the spectrophotometer according to the invention is more particularly explained. Arranged following the light source 15 are the monochromator 16 a sample-changer 17 and a photo-electric cell arrangement 18. The voltage produced by the photo-electric cell arrangement is amplified in the alternating current amplifier 19 and fed to the electrical indicating instrument 3. In FIG. 3 the elements 5, 6, 7 and 8 of FIG. 2 are designated by 40.

When e.g. extinction measurements are carried out a light-transmitting standard substance is first placed in the ray path for instance a cell 20 filled with a standard solution. As light is incident upon the photo-electric cell arrangement 18 from the light flux transmitted by the standard solution the follower control device comes into action when the vibrator relay 9 delivery an alternating current. By means of the servomotor 11 the exit slit 14 of the monochromator 16 is then adjusted until the indicating instrument 3 shows for instance the deflection 100. This pointer deflection is every time adjusted automatically and more particularly independently of any variattions in the light source and independently of the wavelength of the measuring light set at any given time in the monochromator when the standard substance is brought in the path of the light emanating from the exit slit 14 of the monochromator.

Now the cell 21 filled with the light-transmitting test solution is introduced into the raypath by means of a slide 43 in the sample changer 17. The switches 41 and 42 attached to the slide 43 are so connected with it that when the cell 21 is shifted into the raypath the comparison voltage and the amplifier output are automatically short-circuited. In the measurement which can thereupon be carried out the indicating instrument 3 gives the transmission of the test sample 21 immediately as a percentage value.

Instead of the switches 41 and 42 a relay may also be used which is actuated by the changing of the samples. The switches 41 and 42 are with advantage additionally coupled to the lid of the sample changer 17 in such a way that the switches make contact when the lid is opened.

We claim:

A spectrophotometer comprising a light source, a monochromator being adjustable to vary the wavelength of the light emerging from said light source, said monochromator having an exit slit of variable width, means for supporting a standard sample and samples to be measured alternately in the path of the light emerging from said exit slit, a photoelectric cell arranged in the path of the light emanating from one of said samples, and an indicating instrument including a pointer and coupled to said photo-electric cell, said instrument serving for indicating the amplitude of the voltage delivered from said means; means for automatically adjusting the deflection of the pointer of said indicating instrument to the value 100 when said standard sample is in the path of the light emerging from said exit slit, said means comprising means for generating a stabilized voltage which effects a deflection of said pointer to the value 100, means for automatically comparing said stabilized voltage with the voltage produced by said photo-electric cell when said standard sample is in the light path, said comparing means producing an alternating current the amplitude of which depends upon the difference between said two voltages, and means coupled to said comparing means and serving for adjusting the width of said exit slit until said alternating voltage disappears, whereby said exit slit has such a width that the light emanating from said standard sample effects a deflection of the pointer of said indicating instrument of the value 100, said adjusting means consisting of an electric motor to which said alternating current is supplied, of a rotatable disc cam coupled to said motor, of a lever sliding with one of its ends on said disc cam and acting with its other end upon means for mechanically adjusting the width of said exit slit, a generator mechanically coupled to said electric motor, and an electric resistance attached to said disc cam and provided with a fixed tap, said generator being electrically coupled via said resistance to said electric motor in such a way the said voltage fed back to said motor depends upon the angular position of said disc cam.

References Cited in the file of this patent

UNITED STATES PATENTS

| 2,423,774 | Heigl | July 8, 1947 |
| 2,621,298 | Wild et al. | Dec. 9, 1952 |
| 2,795,170 | Hansen et al. | June 11, 1957 |
| 2,879,393 | Cary et al. | Mar. 24, 1959 |

FOREIGN PATENTS

| 381,696 | Great Britain | Oct. 13, 1932 |